D. C. HUGHES.
ELECTRIC LIGHTING DEVICE FOR VEHICLES.
APPLICATION FILED APR. 10, 1913.

1,146,939.

Patented July 20, 1915.
2 SHEETS—SHEET 1.

Witnesses:
Robert F. Weir
Arthur Carlson

Inventor
Davydd C. Hughes

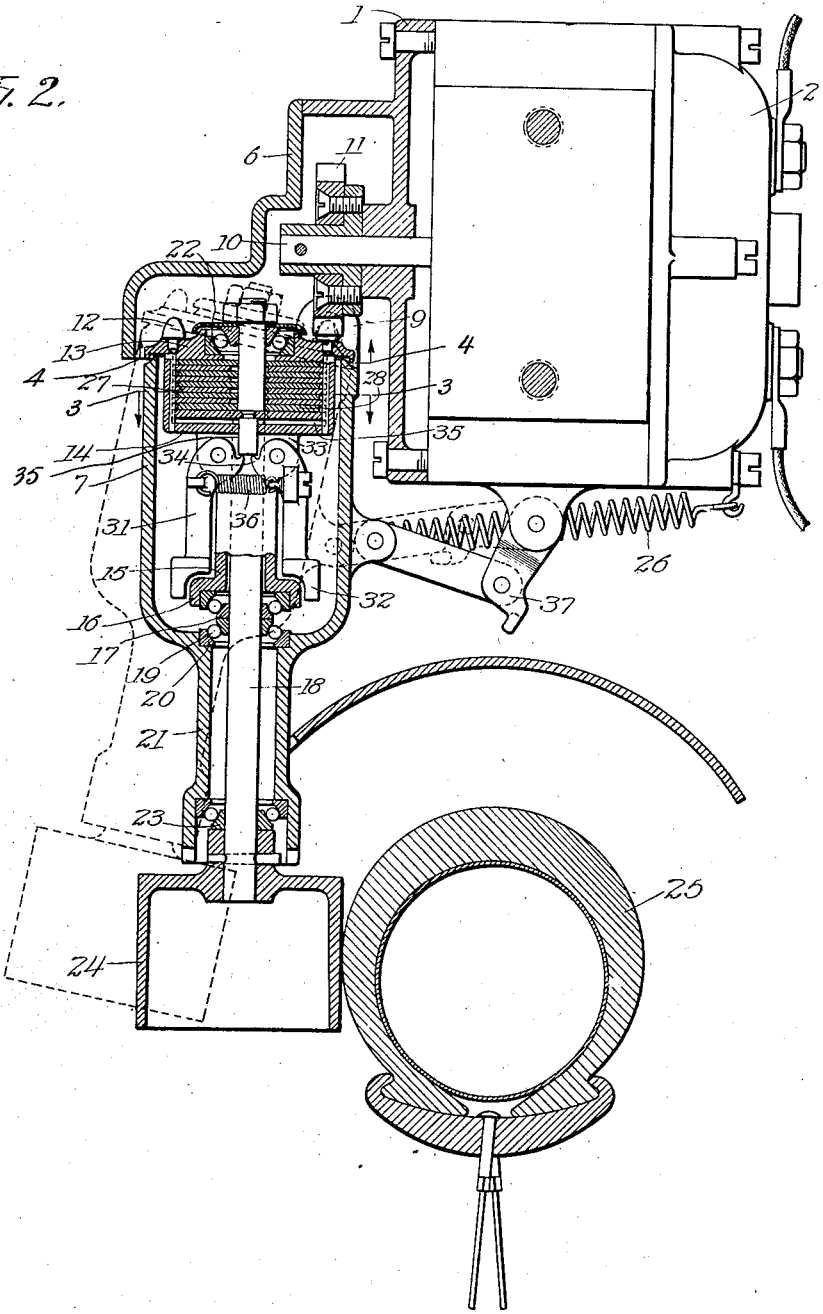

UNITED STATES PATENT OFFICE.

DAVYDD C. HUGHES, OF CHICAGO, ILLINOIS, ASSIGNOR TO HUGHES-WESSLING COMPANY, OF CHICAGO, ILLINOIS, A CORPORATION OF ILLINOIS.

ELECTRIC-LIGHTING DEVICE FOR VEHICLES.

1,146,939.

Specification of Letters Patent.  Patented July 20, 1915.

Application filed April 10, 1913. Serial No. 760,115.

*To all whom it may concern:*

Be it known that I, DAVYDD C. HUGHES, a citizen of the United States, residing at Chicago, in the county of Cook and State of Illinois, have invented new and useful Improvements in Electric-Lighting Devices for Vehicles, of which the following is a full, clear, concise, and exact description, reference being had to the accompanying drawing, forming a part of this specification.

My invention relates to improvements in means for operating electric generators for lights for vehicles.

One of the objects of my invention is to provide an improved means for driving the current-supplying generator for vehicle lights from the vehicle wheels, whereby the speed at which the generator is driven will remain constant irrespective of the speed at which the vehicle travels.

My invention is particularly designed to provide a generating plant for the headlight of a motorcycle, but it will be understood that there are various other uses to which it may be put, and while I have shown one embodiment of my invention in the accompanying drawings it will be understood that various modifications may be made therein without departing from my invention as set forth in the accompanying claims.

Figure 1:
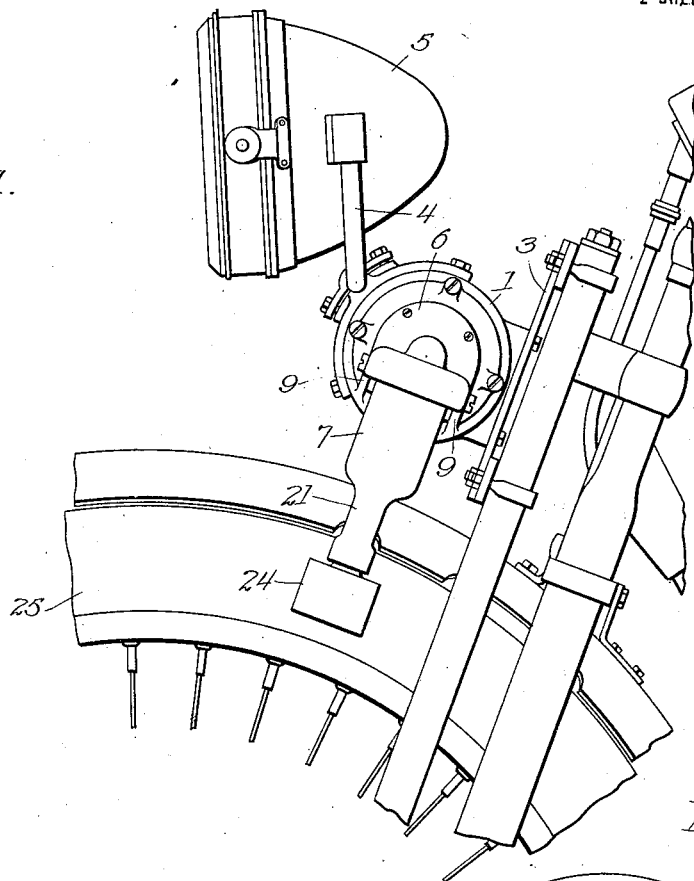
Figure 3:
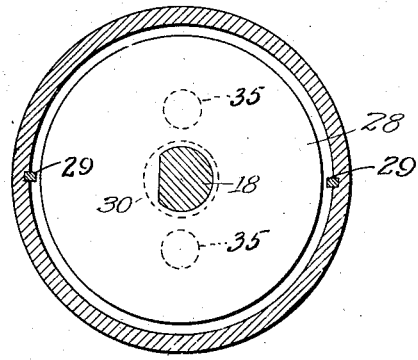
Figure 4:
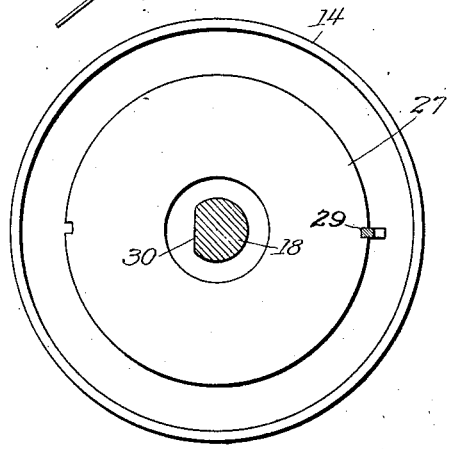

In the drawings—Figure 1 is a partial side elevation of a motorcycle showing the generating plant of my invention attached; Fig. 2 is a transverse sectional view of the driving mechanism for the generator showing also a sectional view of the motorcycle wheel and rear elevation of the generator; Fig. 3 is a sectional view taken on the line 3—3 of Fig. 2; and, Fig. 4 is a sectional view taken on the line 4—4 of Fig. 2.

In the embodiment of my invention illustrated, the frame 1 of the generator 2 is provided with a bracket 3 on its rear by which it may be mounted on one of the front vertical columns of a motorcycle. This frame is also provided with bracket arms 4 arranged to support an electric headlight 5. One side of the frame is provided with a laterally extending hood 6 which extends over one of the bearings of the generator and serves as a hood for the housing 7 of part of the driving mechanism of the generator. This housing is pivotally supported between a pair of lugs 9, formed on the hood 6, to permit its lower end to be swung outwardly.

One end 10 of the shaft of the generator has secured thereon a pinion 11 which is adapted to mesh with the rounded teeth 12 projecting from the top surface of a gear 13 secured to the top of a cup 14. This cup has a tubular extension 15, the base of which is flared to form a cone bearing 16, and between this bearing and the double cone 17 are arranged balls to reduce friction. The double cone 17 is secured upon a shaft 18 extending through the housing and through the cup, and rests upon suitable balls 19 interposed between it and a cone bearing 20 secured in a restricted portion 21 in the housing 7. The shaft 18 is also supported by a cone bearing 22 on the top of the gear 13 and is prevented from moving upwardly in the housing by a cone bearing 23. Secured to the lower end of the shaft 18 is a friction drive wheel 24 which is adapted to engage the side of the motorcycle wheel 25 and be driven therefrom. This wheel 24 is held into engagement with the motorcycle wheel by a spring 26, one end of which is connected to the generator frame and the other end to the housing 7.

Within the cup 14 are arranged two sets of disks 27 and 28. The disks of one set 27 are keyed at their peripheries, as at 29, with the side walls of the cup, and the disks of the other set 28 are keyed, as at 30, to the top of the shaft 18. The disks are moved into close engagement with each other by vertical movement and this movement is imparted thereto by a ball governor comprising a pair of arms 31 and 32 pivoted to ears 33 depending from the bottom of the cup. Each arm is provided with a laterally extending finger 34 adapted to engage the bottom of pins 35 extending through the bottom of the cup and engaging the bottom disk. The two arms 32 are held together by a coiled spring 36 and as long as the two arms are held together under the influence of the spring the disks will be forced together and the gear 13 rotate with the shaft 18.

The operation of the device will be readily understood. The gearing is such that with the motorcycle running at its slowest speed the generator will be operating at two thousand R. P. M. When the vehicle is driven at a faster speed, centrifugal force will cause the lower ends of the arms 32 to move outwardly, slightly releasing the clamping of the disks of the clutch and permitting a slip which prevents the generator from being driven too fast. Of course as the speed is increased the slip increases and as the speed decreases the slip decreases, so that the generator will always operate at a constant speed irrespective of the speed of the vehicle.

When it is not desired to operate the light, the toggle 37 interposed between the housing 7 and the generator frame may be straightened, which will swing the housing on its hinges and move the wheel 24 out of engagement with the vehicle wheel.

Having thus described my invention, what I claim as new and desire to secure by Letters Patent, is:—

1. The combination with a vehicle having a frame and a wheel turning in the frame, of a generator having a spindle detachably mounted on the vehicle frame with the said spindle extending transverse to the plane of the vehicle wheel, a shaft extending substantially perpendicular to the generator spindle and parallel to a radius of the vehicle wheel but at one side of the plane of the wheel, means pivotally supporting the shaft to swing about a transverse axis which is also transverse to and intersects the axis of the generator spindle, operative connection between the shaft and the generator spindle, a friction wheel on the shaft in line with the rim of the vehicle wheel and a spring urging the shaft toward the vehicle wheel.

2. The combination with a vehicle having a frame and a wheel turning in the frame, of a generator having a spindle detachably mounted on the vehicle frame with the said spindle extending transverse to the plane of the vehicle wheel, a shaft extending substantially perpendicular to the generator spindle and parallel to a radius of the vehicle wheel but at one side of the plane of the wheel, means pivotally supporting the shaft to swing about a transverse axis which is also transverse to and intersects the axis of the generator spindle, operative connection between the shaft and the generator spindle, a friction wheel on the shaft in line with the rim of the vehicle wheel, a spring urging the shaft toward the vehicle wheel, a pair of toggle links for moving the shaft in opposition to the spring and a stop for limiting the throw of the toggle links in one direction.

In witness whereof, I have hereunto subscribed my name in the presence of two witnesses.

DAVYDD C. HUGHES.

Witnesses:
 E. R. KING,
 W. PERRY HAHN.